United States Patent [19]

Bosso et al.

[11] 4,260,720
[45] Apr. 7, 1981

[54] NOVEL MERCAPTO CHAIN EXTENDED PRODUCTS AND THEIR USE IN CATIONIC ELECTRODEPOSITION

[75] Inventors: Joseph F. Bosso, Lower Burrell; Richard M. Nugent, Allison Park; Joseph E. Plasynski, Arnold, all of Pa.

[73] Assignee: PPG Industries, Inc., Pittsburgh, Pa.

[21] Appl. No.: 90,166

[22] Filed: Oct. 31, 1979

[51] Int. Cl.³ .................... C08G 59/14; C08L 63/00
[52] U.S. Cl. .................................. 528/109; 528/337; 528/374; 260/29.2 EP
[58] Field of Search ............... 260/29.2 EP; 528/109, 528/337, 374

[56] References Cited

U.S. PATENT DOCUMENTS

| | | | |
|---|---|---|---|
| 3,732,309 | 5/1973 | Garnish et al. | 260/583 P |
| 3,803,089 | 4/1974 | Jones et al. | 260/47 EC |
| 4,029,621 | 4/1976 | Hartman et al. | 260/29.2 EP |
| 4,035,272 | 7/1977 | McGinniss | 204/181 |
| 4,035,274 | 7/1977 | McGinniss | 204/181 |
| 4,092,293 | 5/1978 | Harris et al. | 260/47 EC |
| 4,104,147 | 8/1978 | Marchetti et al. | 204/181 C |
| 4,136,086 | 1/1979 | Baumann et al. | 528/99 |

Primary Examiner—Earl A. Nielsen
Attorney, Agent, or Firm—William J. Uhl

[57] ABSTRACT

Novel chain-extended cationic resinous products suitable for use in cationic electrodeposition are disclosed. The products are formed by chain extending polyepoxides with polymercapto compounds and reacting with amines to provide cationic groups.

15 Claims, 2 Drawing Figures

NOVEL MERCAPTO CHAIN EXTENDED PRODUCTS AND THEIR USE IN CATIONIC ELECTRODEPOSITION

BACKGROUND OF THE INVENTION

The invention relates to resinous reaction products containing cationic groups and to the use of these products in cationic electrodeposition. More particularly, this invention relates to cationic resinous reaction products which are prepared from chain extended epoxide resins.

Cationic electrodepositable resins are known in the art. A preferred class of resins are those prepared from epoxy resins such as disclosed in U.S. Pat. No. 4,104,147 to Marchetti, Jerabek and Zwack.

This patent discloses chain extension of polyepoxides with organic polyols such as polymeric polyols. The chain extended products can then be reacted with a secondary amine and solubilized with acid to form cationic electrodepositable compositions. The resins have excellent properties such as high rupture voltage, good film forming properties and deposit as films with good flexibility.

One problem associated with polymeric polyol chain extension is competing reactions. Under chain extension reaction conditions, which are usually in the presence of an amine catalyst, epoxy-epoxy reaction and epoxy-secondary hydroxyl reactions compete with the desired polymeric hydroxyl-epoxy reaction. The competing reactions may consume too much of the epoxy functionality resulting in the presence of excess amine in the reaction product which adversely affects the dispersion properties of the resin as well as its throw power and film-forming properties. Also, these competing reactions if not controlled can present manufacturing difficulties, for example, undesirably high resin viscosities which are believed to be due to polymer branching.

An indication of this can be seen in FIG. 2 which is a plot of the reduced Gardner-Holdt viscosity (50 percent resin solids in 2-ethoxyethanol) versus time in hours of the reaction mixture which involves chain extension of a polyglycidyl ether of a polyphenol with a poly(oxytetramethylene) glycol having a molecular weight of 650. As shown in FIG. 2, the viscosity increases rapidly with time. If the viscosity is not carefully monitored, the reaction mixture could easily go to gelation. This is a possibility in a commercial production situation where the operator in charge of the reaction may not be able to monitor carefully the viscosity of the reaction with time.

It has been found that these problems can be significantly minimized by chain extending with a polymercapto compound, particularly a polymeric polymercapto compound. It is believed that under chain extension reaction conditions, the mercapto-epoxy reaction goes in relatively high yield with a minimum amount of competing side reactions. This results in a resin which has better properties and which is easier to manufacture, particularly on a commercial scale.

Reference is made to FIG. 1 which is a plot of the reduced Gardner-Holdt viscosity versus time for Example I of the present invention. Example I involves chain extension of a polyglycidyl ether of a polyphenol with a dimercapto polymer obtained from reacting poly(oxytetramethylene) glycol having a molecular weight of 650 with mercapto propionic acid in a molar ratio of 1:2. As shown in FIG. 1, the viscosity increases relatively slowly over the period of about 1½ hours. At this point, the viscosity remains essentially constant with time. In commercial production, this can be important because if the operator in charge of the reaction is distracted and loses track of the time of the reaction, the viscosity of the reaction mixture will level out and not proceed to gelation.

SUMMARY OF THE INVENTION

In accordance with the present invention, a resinous binder suitable for use in cationic electrodeposition is provided. The resin is formed from reacting:
(A) a polyepoxide which has a 1,2-epoxy equivalency greater than one and preferably about two,
(B) a polymercapto compound, such as a polymeric polymercapto compound, and preferably a polymeric dimercapto compound,
(C) an amine.

The equivalent ratio of mercapto groups in (B) to epoxy groups in (A) being less than one, preferably about 0.1 to about 0.8:1. The reaction product contains cationic groups which are derived from the amine.

The invention also provides for a method of cationic electrodeposition employing the above-described resinous binder dispersed in aqueous medium.

PRIOR ART

U.S. Pat. Nos. 4,035,272 and 4,035,274 to McGinniss disclose cationic electrodepositable compositions containing pendent mercaptan groups. The patents indicate that the resins can be derived from epoxy resins. Examples show reacting epoxy resins such as polyglycidyl ethers of polyphenols with polymercapto compounds such as trimethylolpropane tri-(betamercaptopropionate). Although some chain extension through reaction of the epoxy functionality with the mercapto groups is possible, the equivalent ratio of mercapto groups to epoxy groups is greater than one such that chain extension is minimized and a product which contains unreacted mercapto groups is obtained.

U.S. Pat. No. 4,092,293 discloses the use of polymercapto compounds as curing agents for epoxy resins.

U.S. Pat. No. 4,029,621 discloses reacting epoxy resins with a compound containing a single mercapto group and a group hydrolyzable and a carboxyl group such as an alkyl ester of mercapto acetic acid. The product can be hydrolyzed and solubilized such as with aqueous amines to form anionic compositions. The patent does not disclose the use of dimercapto compounds nor the production of cationic electrodepositable compositions.

U.S. Pat. No. 4,136,086 discloses chain extension of polyepoxides with dimercapto compounds. However, there is no disclosure in the reference of producing cationic compositions.

DETAILED DESCRIPTION

Figure 1:
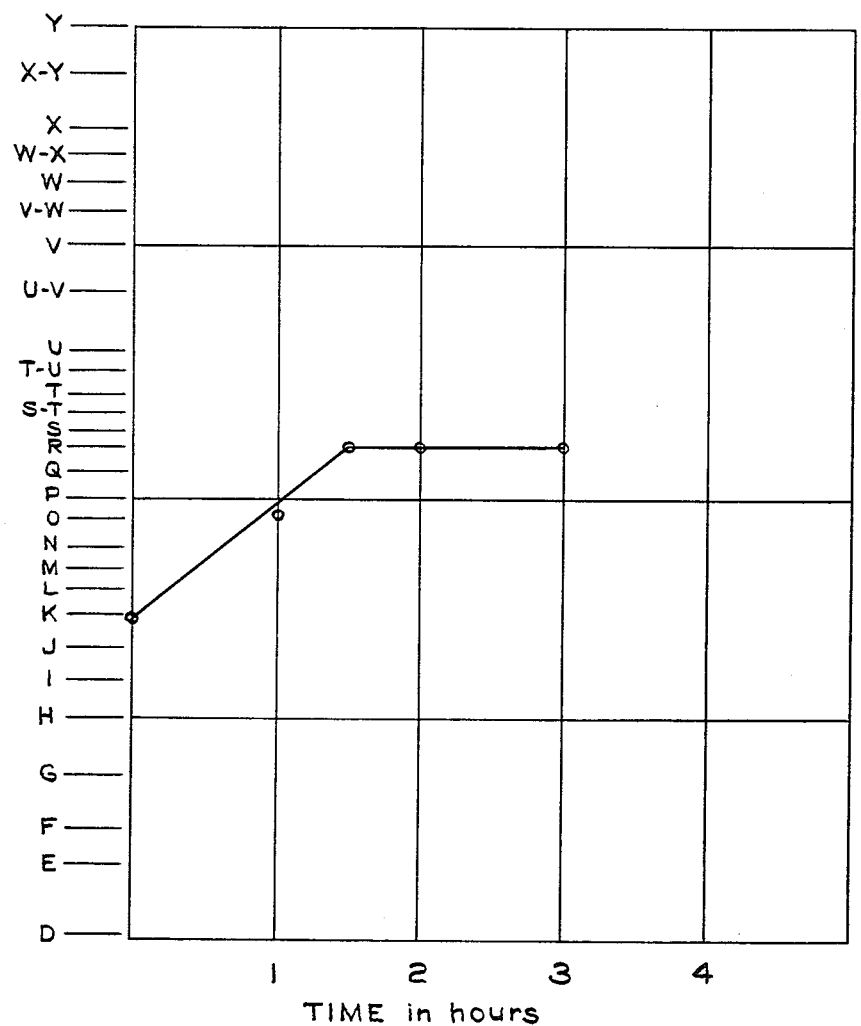
FIGS. 1 and 2 are graphs showing plotting the Gardner-Holdt viscosity of the reaction mixtures of Example I and Comparative Example XII as a function of time.

The non-gelled resinous reaction products of the present invention are formed from reacting a polyepoxide with a polymercapto compound and an organic amine. Typically, the polyepoxide is first chain extended or advanced with the polymercapto compound in the presence of a catalyst such as tin compounds, for example, stannous octoate, and phosphonium salts, for example, ethyltriphenyl phosphonium iodide and ethyltriphenyl phosphonium acetate, followed by reaction with the organic amine. The reaction product can be treated with an acid to neutralize at least part of the amine groups. Alternately, the polyepoxide can be first reacted with the organic amine followed by chain extension with the polymercapto compound.

The polyepoxides which are used in the practice of the invention are polymers having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyphenols such as Bisphenol A. These polyepoxides can be produced by etherification of a polyphenol with epihalohydrin or dihalohydrin such as epichlorohydrin or dichlorohydrin in the presence of alkali. Examples of polyphenols are 2,2-bis(4-hydroxyphenyl)propane, 1,1-bis-(4-hydroxyphenyl)ethane, 2-methyl-1,1-bis-(4-hydroxyphenyl)propane, 2,2-bis-(4-hydroxy-3-tertiarybutylphenyl)propane, bis-(2-hydroxynaphthyl)methane, 1,5-dihydroxy-3-naphthalene or the like.

Besides polyphenols, other cyclic phenols can be used in preparing the polyglycidyl ethers of cyclic polyol derivatives. Examples of other cyclic polyols would be alicyclic polyols, particularly cycloaliphatic polyols, such as 1,2-cyclohexanediol, 1,4-cyclohexanediol, 1,2-bis(hydroxymethyl) cyclohexane, 1,3-bis(hydroxymethyl) cyclohexane and hydrogenated Bisphenol A.

Also, oxyalkylated adducts such as ethylene and propylene oxide adducts of these alicyclic polyols and polyphenols mentioned above can be used as the cyclic polyol component.

Examples of other polyepoxides are polyglycidyl ethers of polyhydric alcohols, such as ethylene glycol, diethylene glycol, triethylene glycol, 1,2-propylene glycol, 1,3-propylene glycol, 1,4-butylene glycol, 1,5-pentanediol and the like.

Polyglycidyl esters of polycarboxylic acids which are produced by the reaction of epichlorohydrin or a similar epoxy compound with an aliphatic or aromatic polycarboxylic acid can also be used. Examples of polycarboxylic acids are dicarboxylic acids such as adipic acid, succinic acid, glutaric acid, terephthalic acid, dimerized linoleic acid and the like.

The polyepoxides have molecular weights of at least 350 and preferably within the range of 350 to 1500, and more preferably about 350 to 1000.

Usually, the polyepoxides are first reacted with the polymercapto compounds to chain extend the polyepoxides forming advanced or higher molecular weight products. Reaction occurs by the mercapto group opening the epoxide ring forming a thioether linkage and a hydroxyl group.

The equivalent ratio of polymercapto compound to polyepoxide should be less than 1, preferably about 0.1 to about 0.8:1, more preferably 0.3 to 0.6:1 and the reaction is carried out to completion so that the product will contain unreacted epoxy groups and be essentially free of mercapto groups. For the production of linear products, which are preferred, reaction with diepoxides and dimercapto compounds should be used.

Chain extension is accomplished by admixing the polymercapto compound with the polyepoxide optionally in the presence of inert solvent such as aromatic hydrocarbon, for example, toluene, xylene and ketones such as methyl ethyl ketone and methyl isobutyl ketone, and conducting the reaction at a temperature of from about 100° to 140° C. usually in the presence of a catalyst such as a tin compound such as stannous octoate or a phosphonium salt such as ethyl triphenyl phosphonium iodide or ethyl triphenyl phosphonium acetate. The amount of catalyst employed is usually about 0.05 to 3 percent by weight based on total weight of the polyepoxide plus chain extender.

The polymercapto compound may be a simple aliphatic or aromatic polymercapto compound such as those having from 2 to 12 carbon atoms. Dimercapto compounds are preferred and examples include: 1,2-dimercaptoethane; 1,4-dimercaptobutane; 1,6-dimercaptohexane; 1,8-dimercaptooctane; 1,10-dimercaptodecane; 4,5-dimethyl-o-xylene-alpha, alpha'-dithiol and toluylene-3,4-dithiol. Also, dimercapto compounds such as 2,2'-dimercapto diethyl ether, ethylene glycol dimercaptoacetate and ethylene-bis-(3-mercaptopropionate) can be used. Trimercapto compounds can be employed but their use is not preferred. If they are used, care should be taken to avoid gelation. However, good results can be obtained using mixtures of trimercapto compounds and monomercapto compounds such that the average functionality of the mixture is about 2. An example of a trimercapto compound is trimethylolpropane trimercaptoacetate. An example of a monomercapto compound is isooctyl thiolglycolate.

Preferably, the polymercapto compound is a polymer, more preferably a polymeric dimercapto compound, having a molecular weight of from about 100 to 2000, preferably 500 to 1300. Examples of polymeric polymercapto compounds are those prepared by reacting a polymeric polyol, such as a polyester polyol or a polyether polyol or reacting a polymeric polyamine with a monomercapto monocarboxylic acid or the lower alkyl ester thereof such as those having the formula R'OOC—R—SH where R is a divalent organic radical such as alkylene including substituted alkylene containing from 1 to 20 carbon atoms and R' is $C_1$ to $C_4$ alkyl such as methyl and ethyl.

Examples of polyester polyols are polyester diols which are formed by polyesterification of organic dicarboxylic acids or anhydrides such as terephthalic acid, hexahydrophthalic acid, adipic acid and azelaic acid with organic diols such as ethylene glycol, propylene glycol, neopentyl glycol and cyclohexanedimethanol.

Also, lactone polyesters can also be employed. These products are obtained from the reaction of a lactone such as epsilon-caprolactone with a polyol. Such products are described in U.S. Pat. No. 3,169,945. Examples of polyols are those mentioned above in connection with the polyesterification reaction.

Examples of polyether polyols are polyalkylene ether polyols such as poly(oxytetramethylene) glycols and poly(oxyethylene) glycols and poly(oxypropylene) glycols.

Examples of polyamine resins are polyoxyalkylenediamines such as those sold commercially by Jefferson Chemical Company under the trademark JEFFAMINE. Also, condensation products of dicarboxylic acids such as adipic acid and azelaic acid with diamines such as ethylene diamine, 1,4-butanediamine, hexamethylenediamine, ortho, meta and para-phenylenediamine and piperazine.

Polymeric trimercapto compounds can be employed although their use is not preferred. Care should be taken to avoid gelation. However, good results can be obtained using mixtures of polymeric trimercapto compounds and monomercapto compounds such that the average functionality of the mixture is about 2. An example of a polymeric trimercapto compound is the adduct of a polycaprolactone triol commercially available from Union Carbide Corporation as PCP 0301 and mercaptopropionic acid in an equivalent ratio of 1:1.

Preferably, the monomercapto monocarboxylic acid is reacted with the polymeric polyol in an equivalent ratio of about 1:1.

Examples of monomercapto monocarboxylic acids are mercapto acetic acid, 2-mercaptopropionic acid and 3-mercaptopropionic acid.

After the polyepoxide is chain extended with the polymercapto compound, the chain extended product is reacted with the amine. The amine can be a primary, secondary or tertiary amine and mixtures thereof.

The reaction product of the polyepoxide and a primary, secondary or tertiary amine (or mixtures thereof) can be at least partially neutralized with an acid to form a polymeric material containing cationic secondary or tertiary amine salt groups or quaternary ammonium salt groups.

With regard to the reaction with tertiary amines, the tertiary amines can first be neutralized with acid to form the amine salts and the salts reacted with the polyepoxide to form the quaternary ammonium salt group-containing polymer. Alternately, the tertiary amines can be reacted with the polyepoxides in the presence of water to form the quaternary ammonium hydroxide base group-containing polymers. If desired, the quaternary ammonium hydroxide-containing polymer can be subsequently acidified to form quaternary ammonium salt groups. Acidification can be complete or partial such that the polymer contains a mixture of quaternary ammonium hydroxide and quaternary ammonium salt groups.

The preferred amines are monoamines, particularly hydroxyl-containing amines. Although monoamines are preferred, polyamines such as ethylene diamine, diethylene triamine, triethylene tetramine, N-(2-aminoethyl)ethanolamine and piperazine can be used but their use in large amounts is not preferred because they are multifunctional and have a greater tendency to gel the reaction mixture than monoamines.

Tertiary and secondary amines are preferred to primary amines because the primary amines are polyfunctional with regard to reaction to epoxy groups and have a greater tendency to gel the reaction mixture. When using polyamines or primary amines, special precautions should be taken to avoid gelation. For example, excess amine can be used and the excess vacuum stripped at the completion of the reaction. Also, the polyepoxide can be added to the amine to insure that excess amine will be present.

Examples of hydroxyl-containing amines are alkanolamines, dialkanolamines, trialkanolamines, alkylalkanolamines, arylalkanolamines and arylalkylalkanolamines containing from 2 to 18 carbon atoms in the alkanol, alkyl and aryl chains. Specific examples include ethanolamine, N-methylethanolamine, diethanolamine, N-phenylethanolamine, N,N-dimethylethanolamine, N-methyldiethanolamine and triethanolamine.

Amines which do not contain hydroxyl groups such as mono, di and tri alkyl amines and mixed alkyl-aryl amines and substituted amines in which the substituents are other than hydroxyl and in which the substituents do not detrimentally affect the epoxy-amine reaction can also be used. Specific examples of these amines are ethylamine, propylamine, methylethylamine, diethylamine, N,N-dimethylcyclohexylamine, triethylamine and N-benzyldimethylamine. Also, amines such as hydrazine and propylene imine can be used. Ammonia can also be used and is considered for the purposes of this application to be an amine.

Mixtures of the various amines described above can be used. The reaction of the primary and/or secondary amine with the polyepoxide takes place upon mixing the amine with the polyepoxide. The reaction can be conducted neat, or, optionally in the presence of suitable solvent. Reaction may be exothermic and cooling may be desired. However, heating to a moderate temperature, that is, within the range of 50° to 150° C., may be used to hasten the reaction.

The reaction product of the primary or secondary amine with the polyepoxide attains its cationic character by at least partial neutralization with acid. Examples of suitable acids include organic and inorganic acids such as formic acid, acetic acid, lactic acid, phosphoric acid and carbonic acid. The extent of neutralization will depend upon the particular product involved. It is only necessary that sufficient acid be used to disperse the product in water. Typically, the amount of acid used will be sufficient to provide at least 30 percent of the total theoretical neutralization. Excess acid beyond that required for 100 percent total theoretical neutralization can also be used.

As mentioned above, in the reaction of the tertiary amine with the polyepoxide, the tertiary amine can be pre-reacted with the acid such as those mentioned above to form the amine salt and the salt reacted with the polyepoxide to form the quaternary ammonium salt group-containing resin. The reaction is conducted by mixing the amine salt and the polyepoxide together in the presence of water. Typically, the water is employed on the basis of about 1.75 to about 20 percent by weight based on total reaction mixture solids.

Alternately, the tertiary amine can be reacted with the polyepoxide in the presence of water to form a quaternary ammonium hydroxide group-containing polymer which, if desired, may be subsequently acidified. The quaternary ammonium hydroxide-containing polymers can also be used without acid although their use is not preferred.

In forming the quaternary ammonium base group-containing polymers, the reaction temperature can be varied between the lowest temperature at which reaction reasonably proceeds, for example, room temperature, or in the usual case, slightly above room temperature, to a maximum temperature of 100° C. (at atmospheric pressure). At greater than atmospheric pressure, higher reaction temperatures can be used. Preferably, the reaction temperature ranges between about 60° to 100° C. Solvent for the reaction is usually not necessary although a solvent such as a sterically hindered ester, ether or sterically hindered ketone may be used if desired.

In addition to the primary, secondary and tertiary amines disclosed above, a portion of the amine which is reacted with the polyepoxide can be the ketimine of a polyamine. This is described in U.S. Pat. No. 4,104,147 in column 6, line 23, to column 7, line 23, the portions of which are hereby incorporated by reference. The ketimine groups will decompose upon dispersing the amine-epoxy reaction product in water resulting in free primary amine groups which would be reactive with curing agent which are described in more detail below.

With regard to the amount of organic amine and polyepoxide which are reacted with one another, the relative amounts depend upon the extent of cationic group formation desired and this in turn will depend upon the molecular weight of the polymer. The extent of cationic group formation and the molecular weight of the reaction product should be selected that when the cationic polymer is mixed with aqueous medium, a stable dispersion will form. A stable dispersion is one which does not settle or is one which is easily redispersible if some sedimentation occurs. In addition, the dispersion should be of sufficient cationic character that the dispersed resin particles will migrate towards the cathode when an electrical potential is impressed between an anode and a cathode immersed in the aqueous dispersion.

Also, the molecular weight, structure and extent of cationic group formation should be controlled such that the dispersed resin will have the required flow to form a film on the substrate; in the case of electrodeposition, to form a film on the cathode. The film should be insensitive to moisture to the extent that it will not redissolve in the electrodeposition bath or be rinsed away from the coated cathode after its removal from the bath.

In general, most of the cationic linear polymers useful in the practice of the invention have average molecular weights (calculated values) within the range of 500 to 5000 and preferably about 1000 to 3000 and contain from about 0.1 to 3.0, preferably from about 0.3 to 1.0 milliequivalents of cationic nitrogen group per gram of resin solids. Obviously, one must use the skill in the art to couple the molecular weight with the cationic group content to arrive at a satisfactory polymer.

As indicated above, cationic polymers of the present invention contain active hydrogens such as those derived from hydroxyl, primary and secondary amino which make them reactive at elevated temperatures with a curing agent. The curing agent which is used should be one which is stable in the presence of the cationic polymer at room temperature but reactive with the active hydrogens at elevated temperatures, that is, from about 90° to 260° C. to form a crosslinked product. Examples of suitable curing agents are aminoplast resins, capped isocyanates and phenolic resins such as phenol-formaldehyde condensates including allyl ether derivatives thereof.

The preferred curing agents are the capped isocyanates and these are described in U.S. Pat. No. 4,104,147, column 7, line 36, continuing to column 8, line 37, the portions of which are hereby incorporated by reference.

Sufficient capped polyisocyanate is present in the coating system such that the equivalent ratio of latent isocyanate groups to active hydrogens is at least 0.1:1 and preferably about 0.3 to 1:1.

Besides the blocked or capped isocyanates, aminoplast resins can also be employed as curing agents in the practice of the present invention. Suitable aminoplasts for use with the reaction products are described in U.S. Pat. No. 3,937,679 to Bosso and Wismer in column 16, line 3, continuing to column 17, line 47, the portions of which are hereby incorporated by reference. As disclosed in the aforementioned portions of the U.S. Pat. No. 3,937,679, the aminoplast can be used in combination with methylol phenol ethers. The aminoplast curing agents usually constitute from about 1 to 60 and preferably 5 to 40 percent by weight of the resinous composition based on total weight of aminoplast and the reaction product of a polyepoxide and amine.

The resinous reaction products of the present invention are non-gelled and are employed in the form of aqueous dispersions. The term "dispersion" as used within the context of the present invention is believed to be a two-phase, transparent, translucent or opaque aqueous resinous system in which the resin is the dispersed phase and water is the continuous phase. Average particle size diameter of the resinous phase is generally less than 10 and preferably less than 5 microns. The concentration of the resinous phase in the aqueous medium depends upon the particular end use of the dispersion and in general is not critical. For example, the aqueous dispersion preferably contains at least 1 and usually from about 5 to 50 percent by weight resin solids. By non-gelled is meant the reaction products are substantially free of crosslinking and have an intrinsic viscosity when dissolved in a suitable solvent. The intrinsic viscosity of the reaction product is an indication of its molecular weight. A gelled reaction product on the other hand, since it has essentially infinitely high molecular weight, will have an intrinsic viscosity too high to measure.

Besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 4-methoxy-2-pentanone, ethylene and propylene glycol, and the monoethyl, monobutyl and monohexyl ethers of ethylene glycol. The amount of coalescing solvent is not unduly critical and is generally between about 0.01 and 40 percent by weight, preferably about 0.05 to about 25 percent by weight based on total weight of the aqueous medium.

In some instances, a pigment composition and, if desired, various additives such as surfactants or wetting agents are included in the dispersion. The pigment composition may be any of the conventional types, comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as pigment-to-resin ratio. In the practice of the present invention, the pigment-to-resin ratio is usually within the range of 0.02 to 1:1. The other additives mentioned above are usually in the dispersion in amounts of 0.01 to 3 percent by weight based on total weight of resin solids.

Also, soluble lead such as lead acetate may be added to the dispersion. See, for example, U.S. Pat. No. 4,115,226 to Zwack and Jerabek.

When the aqueous dispersions as described above are employed for use in electrodeposition, the aqueous dispersion is placed in contact with an electrically conductive anode and an electrically conductive cathode with the surface to be coated being the cathode. Following contact with the aqueous dispersion, an adherent film of the coating composition is deposited on the cathode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, but typically between 50 and 500 volts. The current density is usually between 1.0 ampere and 15 amperes per square foot and tends to decrease during electrodeposition indicating the formation of an insulating film.

The resinous compositions of the present invention can also be used in other conventional coating applications such as flow, dip, spray and roll coating applications. For electrodeposition and the other conventional coating applications, the coating compositions can be applied to a variety of electroconductive substrates especially metal such as steel, aluminum, copper, magnesium and the like, but also including metallized plastic and conductive carbon-coated materials. For the other conventional coating applications, the compositions can be applied to the non-metallic substrates such as glass, wood and plastic.

After the coating has been applied by electrocoating or other conventional coating applications, it is cured usually by baking at elevated temperatures such as 90° to 260° C. for about 1 to 30 minutes.

Illustrating the invention are the following examples, which, however, are not to be considered as limiting the invention to their details. All parts and percentages in the examples as well as throughout the specification are by weight unless otherwise indicated.

EXAMPLES

Preparation of Resinous Binders

EXAMPLE I

The following example shows the chain extension of a polyepoxide with a polymeric dimercaptan which was prepared by esterifying a polyether diol with mercaptopropionic acid in a molar ratio of 1:2. The chain-extended resin was then reacted with secondary amine, combined with a crosslinker, treated with an acid and dispersed in water to form a cationic electrodepositable composition.

The cationic resin was prepared as follows:

| Ingredients | Parts by Weight | Solids |
|---|---|---|
| EPON 829[1] | 553.7 | 531.6 |
| Bisphenol A | 151.8 | 151.8 |
| xylene | 30 | — |
| dimercapto-terminated polymer[2] | 322.4 | 322.4 |
| ethyltriphenyl phosphonium iodide | 1.0 | 1.0 |
| capped isocyanate crosslinker[3] | 652.6 | 456.8 |
| diketimine derived from diethylene triamine and methyl isobutyl ketone (70% solids in methyl isobutyl ketone) | 54.9 | 38.4 |
| N-methylethanolamine | 41.3 | 41.3 |

[1] Epoxy resin solution made from reacting epichlorohydrin and Bisphenol A having an epoxy equivalent of approximately 193-203 commercially available from Shell Chemical Company.
[2] Dimercapto polymer obtained from reacting poly(oxytetramethylene) glycol having a molecular weight of 650 and commercially available from Quaker Oats Company as POLYMEG 650 with mercaptopropionic acid in a molar ratio of 1:2.
[3] Polyurethane crosslinker formed from half-capping toluene diisocyanate (80/20 2,4-/2,6-isomer mixture) with 2-butoxyethanol and reacting this product with trimethylolpropane in a 3:1 molar ratio. The crosslinker is present as a 70 percent resin solids solution in 2-ethoxyethanol.

The EPON 829, Bisphenol A and xylene were charged to a reaction vessel and heated with a nitrogen sparge to 200° C. The reaction was held at 200° C. for about one hour. The reaction mixture was cooled to 150° C. and the dimercapto polymer and the ethyltriphenyl phosphonium iodide (catalyst) added. The reaction mixture was further cooled to 110° C. and held at this temperature for about 1½ hours until the reaction mixture attained a reduced Gardner-Holdt viscosity (50 percent resin solids solution in 2-ethoxyethanol) of Q-R. As shown in FIG. 1, the viscosity appeared to stabilize as this point.

The polyurethane crosslinker, the diketimine derivative and the N-methylethanolamine were then added and the temperature of the reaction mixture brought to 100° C. and held at this temperature for about one hour. The reaction mixture had a solids content of 82.8 percent and the reduced Gardner-Holdt viscosity was T-U.

The reaction mixture was treated with acid and dispersed in water by adding 1688.8 parts by weight of the reaction mixture to an aqueous mixture containing 22.8 parts by weight of acetic acid, 1169.2 parts by weight of deionized water and 36 parts by weight of a surfactant mixture. The surfactant mixture was prepared by mixing 120 parts by weight of an alkyl imidazoline (GEIGY AMINE C), 120 parts by weight of an acetylenic diol (SURFYNOL 104), 19 parts by weight of acetic acid, 120 parts by weight of 2-butoxyethanol and 221 parts by weight of deionized water.

After the resinous reaction product had been dispersed, additional deionized water was added to reduce the resin solids content to about 35 percent.

EXAMPLE II

A cationic resin similar to that of Example I was prepared with the exception that the chain-extended resin was reacted with both cocoamine and N-methylethanolamine. The charge for preparing the reaction product was as follows:

| Ingredients | Parts by Weight | Solids |
|---|---|---|
| EPON 829 | 553.7 | 531.6 |
| Bisphenol A | 151.8 | 151.8 |
| xylene | 30.0 | — |
| dimercapto polymer of Example I | 161.2 | 161.2 |
| ethyltriphenyl phosphonium iodide | 1.0 | 1.0 |
| cocoamine | 37.4 | 37.4 |
| polyurethane crosslinker of Example I | 575.1 | 402.6 |
| ketimine derivative of Example I | 54.9 | 38.4 |
| N-methylethanolamine | 41.3 | 41.3 |

The conditions for reaction were as generally described in Example I. The reaction product had a reduced Gardner-Holdt viscosity of V. When the reaction product was acidified and dispersed in deionized water in the manner of Example I, a dispersion having a resin solids content of about 35 percent was obtained.

EXAMPLE III

A cationic resin similar to that of Example I was prepared with the exception that the dimercapto chain extender was formed from reacting a poly(oxytetramethylene) glycol having a molecular weight of 1000 (POLYMEG 1000) with mercaptopropionic acid in a molar ratio of 1:2 and stannous octoate catalyst was used in place of ethyltriphenyl phosphonium iodide.

The charge for preparing the reaction product is as follows:

| Ingredients | Parts by Weight | Solids |
|---|---|---|
| EPON 829 | 557.4 | 535.1 |
| Bisphenol A | 152.8 | 152.8 |
| xylene | 30 | — |
| methyl isobutyl ketone | 50 | — |
| dimercapto polymer | 462 | 462 |

-continued

| Ingredients | Parts by Weight | Solids |
|---|---|---|
| stannous octoate[1] | 17.2 | — |
| polyurethane crosslinker of Example I | 1147 | 803 |
| ketimine derivative of Example I | 61 | 42.7 |
| N-methylethanolamine | 37.5 | 37.5 |

[1]Catalyst for chain extension of the polyepoxide with the mercapto chain extender.

The conditions for reaction were as generally described in Example I.

The resinous reaction product had a solids content of 82.3 percent and a reduced Gardner-Holdt viscosity of R−. When acidified and dispersed in deionized water in the manner of Example I, a dispersion having a resin solids content of about 35 percent was obtained.

EXAMPLE IV

This example shows the preparation of a cationic resin similar to that of Example III with the exception that the dimercapto chain extender is formed from reacting polypropylene glycol having a molecular weight of about 1000 with mercaptopropionic acid. The charge for preparing the reaction product was as follows:

| Ingredients | Parts by Weight | Solids |
|---|---|---|
| EPON 829 | 557.4 | 535.1 |
| Bisphenol A | 152.8 | 152.8 |
| xylene | 30 | — |
| methyl isobutyl ketone | 50 | — |
| dimercapto polymer | 464 | 464 |
| stannous octoate | 17.3 | — |
| polyurethane crosslinker of Example I | 738.7 | 517.1 |
| diketimine derivative of Example I | 58.5 | 41.0 |
| N-methylethanolamine | 37.5 | 37.5 |

The conditions for reaction were as generally described in Example I. The resinous reaction product had a solids content of 85.1 percent and a reduced Gardner-Holdt viscosity of J+. When acidified and dispersed in deionized water as described in Example I, a dispersion having a resin solids content of about 35 percent was obtained.

EXAMPLE V

The following example shows the preparation of a cationic resin similar to that of Example III with the exception that the dimercapto chain extender was formed from reacting a polycaprolactone diol having a molecular weight of 830 (commercially available from Union Carbide Corporation as PCP 0210) with mercaptopropionic acid in a molar ratio of 1:2.

The charge for preparing the reaction product was as follows:

| Ingredients | Parts by Weight | Solids |
|---|---|---|
| EPON 829 | 557.4 | 535.1 |
| Bisphenol A | 152.8 | 152.8 |
| xylene | 30 | — |
| methyl isobutyl ketone | 50 | — |
| dimercapto polymer | 390.8 | 390.8 |
| stannous octoate | 16.2 | — |
| polyurethane crosslinker of Example I | 538.7 | 377.1 |
| diketimine derivative of Example I | 54.9 | 38.4 |
| N-methylethanolamine | 37.5 | 37.5 |

The conditions for reaction were as generally described in Example I. The resinous reaction product had a solids content of 87.3 percent and a reduced Gardner-Holdt viscosity of U−. When acidified and dispersed in deionized water as described in Example I, a dispersion having a solids content of about 35 percent was obtained.

EXAMPLE VI

The following example shows the preparation of a cationic resin similar to that of Example III with the exception that the dimercapto chain extender was formed from reacting a polycaprolactone diol (commercially available from Union Carbide Corporation as PCP 0200) having a molecular weight of 530 with mercaptopropionic acid in a molar ratio of 1:2. The charge for preparing the reaction product was as follows:

| Ingredients | Parts by Weight | Solids |
|---|---|---|
| EPON 829 | 545.5 | 523.6 |
| Bisphenol A | 149.5 | 149.5 |
| xylene | 30 | — |
| methyl isobutyl ketone | 50 | — |
| dimercapto polymer | 248.1 | 245.9 |
| stannous octoate | 14.0 | — |
| polyurethane crosslinker of Example I | 611.4 | 434.1 |
| diketimine derivative of Example I | 55.2 | 38.6 |
| N-methylethanolamine | 35.7 | 35.7 |

The conditions for reaction were as generally described in Example I. The resinous reaction product had a solids content of 84.4 percent and a reduced Gardner-Holdt viscosity of U−. When acidified and dispersed in deionized water as described in Example I, a dipsersion having a solids content of about 35 percent was obtained.

EXAMPLE VII

The following example shows the preparation of a cationic resin similar to that of Example I with the exception that the mercapto chain extender was formed from reacting a poly(neopentyl glycol adipate) diol having a molecular weight of about 940 with mercaptopropionic acid in a molar ratio of 1:2. The charge for preparing the reaction product was as follows:

| Ingredients | Parts by Weight | Solids |
|---|---|---|
| EPON 829 | 1107.4 | 1063.2 |
| Bisphenol A | 303.6 | 303.6 |
| xylene | 60.0 | — |
| dimercapto polymer | 703.6 | 703.6 |
| ethyltriphenyl phosphonium iodide | 2.0 | 2.0 |
| polyurethane crosslinker of Example I | 1337.8 | 936.5 |
| diketimine derivative of Example I | 112.5 | 78.8 |
| N-methylethanolamine | 82.5 | 82.5 |

The conditions for reaction were as generally described in Example I. The reaction product had a solids content of 85.5 percent. When the reaction product was acidified and dispersed in deionized water as described in Example I, a dispersion having a solids content of about 35 percent was obtained.

EXAMPLE VIII

The following example shows chain extension of a polyepoxide with a polymeric dimercaptan as generally described in Example VII. The chain-extended resin was then adducted with a mixture of tertiary amine salts to form the quaternary ammonium salt group-containing polymer which was combined with a polyurethane crosslinker and dispersed in water to form a cationic electrodepositable composition.

The cationic electrodepositable composition was prepared as follows:

| Ingredients | Parts by Weight | Solids |
|---|---|---|
| EPON 829 | 1392.0 | 1343.3 |
| Bisphenol A | 438.4 | 438.4 |
| xylene | 12.4 | — |
| TEXANOL[1] | 133.4 | — |
| dimercapto polymer of Example VII | 745.5 | 745.5 |
| stannous octoate | 43.4 | 43.4 |
| 2-phenoxyethanol | 160.7 | — |
| polyurethane crosslinker[2] | 978.0 | 596.7 |
| aqueous dimethylethanolamine lactate | 119.7 | 89.8 |
| aqueous dimethylcyclohexylamine lactate | 107.5 | 80.6 |
| deionized water | 197.4 | — |

[1] 2,2,4-trimethyl pentane-1,3-diol monoisobutyrate commercially available from Eastman Chemical Company.
[2] Polyurethane crosslinker formed from half-capping toluene diisocyanate (80/20 2,4-/2,6-isomer mixture) with 2-butoxyethanol and reacting this product with trimethylolpropane in a 3:1 molar ratio. The crosslinker is present as a 61 percent resin solids solution in a ½ mixture of 2-phenoxyethanol and 2-butoxyethanol.

The EPON 829, Bisphenol A and xylene were charged to a reaction vessel and heated under a nitrogen atmosphere to 150° C. to initiate an exotherm. The exotherm was maintained for about 1½ hours followed by cooling the reaction mixture to 139° C. The TEXANOL and the dimercapto polymer were added and the reaction mixture cooled further to 90° C. followed by the addition of the stannous octoate. The reaction mixture was held at a temperature of 90°–100° C. until a reduced Gardner-Holdt viscosity of P-Q was obtained. The 2-phenoxyethanol was then added followed by the addition of the polyurethane crosslinker, the dimethylethanolamine lactate, the dimethylcyclohexylamine lactate and the deionized water. The reaction mixture was heated to 90° C. and held at 90°–100° C. for about two hours.

The reaction mixture was dispersed in water by adding 4198.5 parts by weight of the reaction mixture (3237.5 parts resin solids) to 5051.6 parts by weight of deionized water to form an aqueous dispersion having a resin solids content of about 35 percent. The polymer contained 0.267 milliequivalents of total base and 0.226 milliequivalents of quaternary ammonium base per gram of resin solids.

EXAMPLE IX

The following example shows chain extension of a polyepoxide with a monomeric dimercaptan (dimercapto diethylether). The chain-extended resin was then reacted with secondary amine, combined with a crosslinker, treated with acid and dispersed in water to form a cationic electrodepositable composition.

The cationic resin was prepared as follows:

| Ingredients | Parts by Weight | Solids |
|---|---|---|
| EPON 829 | 553.7 | 531.6 |
| Bisphenol A | 151.8 | 151.8 |
| xylene | 30.0 | — |
| dimercapto diethylether | 51.8 | 51.8 |
| 10% ethyltriphenyl phosphonium iodide in 2-butoxyethanol | 8.0 | 0.8 |
| polyurethane crosslinker of Example I | 555.4 | 388.8 |
| ketimine derivative of Example I | 58.5 | 40.9 |
| N-methylethanolamine | 38.3 | 38.3 |

The conditions for reaction were as generally described in Example I. The reaction product had a reduced Gardner-Holdt viscosity of Q-R. When the reaction product was acidified and dispersed in deionized water in the manner of Example I, a dispersion having a resin solids content of about 35 percent was obtained.

EXAMPLE X

The following example shows chain extension of a polyepoxide with a polymeric trimercaptan. The chain-extended resin was then reacted with a secondary amine, combined with a crosslinker, treated with acid and dispersed in water to form a cationic electrodepositable composition.

The cationic resin was prepared as follows:

| Ingredients | Parts by Weight | Solids |
|---|---|---|
| EPON 829 | 648 | 622 |
| Bisphenol A | 149.3 | 149.3 |
| xylene | 30 | — |
| polymeric trimercapto compound[1] | 368 | 368 |
| 10% ethyltriphenyl phosphonium iodide in 2-butoxyethanol | 10 | 1 |
| polyurethane crosslinker of Example I | 888.1 | 621.7 |
| ketimine derivative of Example I | 109.8 | 76.9 |
| N-methylethanolamine | 45 | 45 |

[1] Trimercapto polymer obtained by reacting a polycaprolactone triol having a molecular weight of 300 and commercially available from Union Carbide Corporation as PCP 0301 with mercaptopropionic acid in a molar ratio of 1:3.

The conditions for reaction were as generally described in Example I. The reaction product had a reduced Gardner-Holdt viscosity of S+.

The reaction product was treated with acid and dispersed in water by adding 2107.3 parts by weight of the reaction product to an aqueous mixture containing 72.7 parts by weight of lactic acid, 1061.7 parts by weight of deionized water and 44.8 parts by weight of surfactant mixture employed in Example I. After the reaction product had been dispersed, additional deionized water was added to reduce the resin solids content to about 35 percent.

The aqueous dispersion (3950 parts by weight) was thinned with an additional 600 parts by weight of deionized water and vacuum stripped at about 85° C. and 10–15 inches of vacuum to remove 450 parts by weight of water and 150 parts by weight of organic solvent. The resultant dispersion had a solids content of 35.3 percent.

EXAMPLE XI

The following example shows chain extension of a polyepoxide with a mixture of the trimercapto compound used in Example X and isooctyl thiolglycolate such that the average functionality of the mixture is about 2. The chain-extended resin was then reacted with a secondary amine, combined with a crosslinker, treated with acid and dispersed in water to form a cationic electrodepositable composition.

The cationic resin was prepared as follows:

| Ingredients | Parts by Weight | Solids |
|---|---|---|
| EPON 829 | 648 | 622 |
| Bisphenol A | 149.3 | 149.3 |
| xylene | 30 | — |
| trimercapto polymer of Example X | 184 | 184 |
| isooctyl thiolglycolate | 102 | 102 |
| 10% ethyltriphenyl phosphonium iodide in 2-butoxyethanol | 10 | 1 |
| polyurethane crosslinker of Example I | 830.4 | 581.3 |

| Ingredients | Parts by Weight | Solids |
|---|---|---|
| ketimine derivative of Example I | 109.8 | 76.9 |
| N-methylethanolamine | 45 | 45 |
| methyl isobutyl ketone | 69.7 | — |

The conditions for reaction were as generally described in Example I.

The reaction product had a reduced Gardner-Holdt viscosity of F-G.

The reaction product was treated with acid and dispersed in water by adding 2040.8 parts by weight of the reaction product to an aqueous mixture containing 72.8 parts by weight of 88 percent aqueous lactic acid and 917.6 parts by weight of deionized water and 41.8 parts by weight of the surfactant mixture of Example I. After the resinous reaction product had been dispersed, additional deionized water was added to reduce the resin solids content to about 36 percent.

The dispersion was thinned with an additional 450 parts by weight of deionized water and vacuum stripped at 85° C. and 10-15 inches of vacuum so as to remove 450 parts of water and 150 parts of organic solvent. The resultant dispersion had a solids content of 38.2 percent.

COMPARATIVE EXAMPLE XII

The following example is similar to Example I with the exception that chain extension of the polyepoxide was conducted with a polyether diol, poly(oxytetramethylene)glycol having a molecular weight of 650 (POLYMEG 650) instead of the dimercapto polymer used in Example I. The charge used in preparing the polymer was as follows:

| Ingredients | Parts by Weight | Solids |
|---|---|---|
| EPON 829 | 737.0 | 711.2 |
| Bisphenol A | 200.7 | 200.7 |
| xylene | 40.2 | — |
| POLYMEG 650 | 342.1 | 342.1 |
| benzyl dimethylamine[1] | 1.3 | 1.3 |
| benzyl dimethylamine | 1.3 | 1.3 |

[1]Catalyst for the chain extension of the polyepoxide with the polyether diol.

Figure 2:
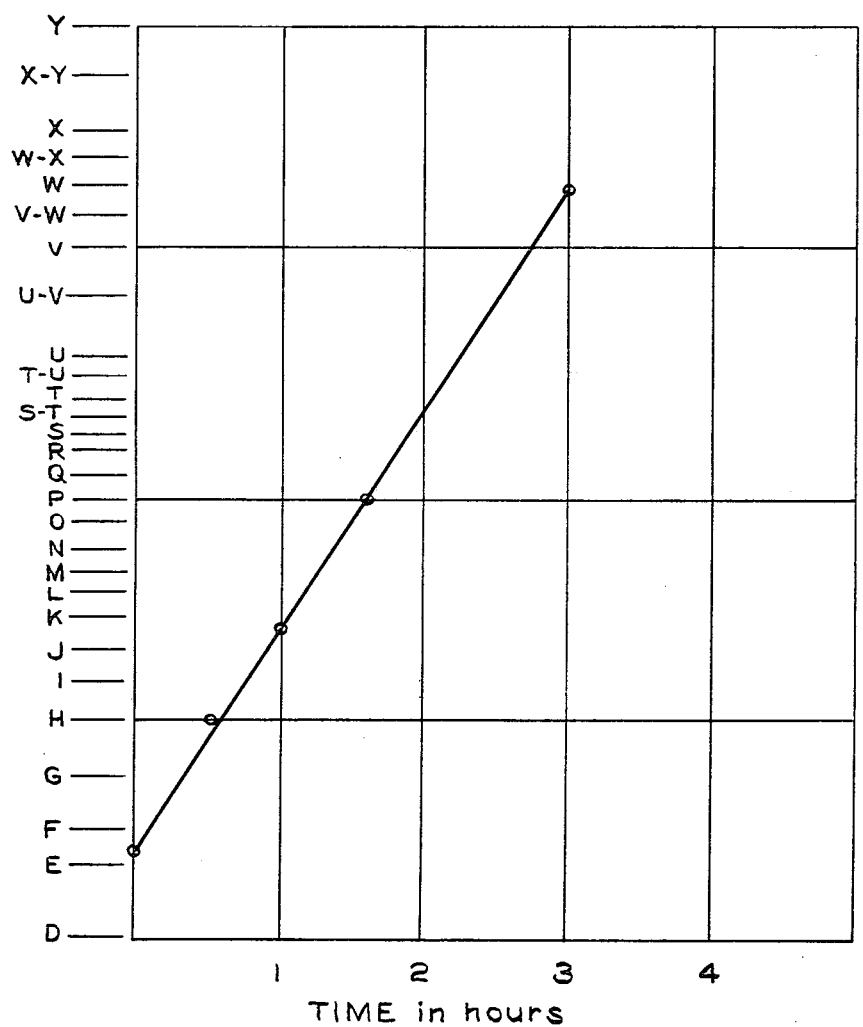

The EPON 829, Bisphenol A and xylene were charged to a reaction vessel and heated with a nitrogen sparge to 200° C. The reaction was held at 200° C. for about one hour. The reaction mixture was cooled to 150° C. and the POLYMEG 650 and the first portion of benzyl dimethylamine (catalyst) added. The reaction mixture was held at 150° C. for about 20 minutes followed by cooling to 130° C. followed by the addition of the second portion of benzyl dimethylamine catalyst. A plot of the reduced Gardner-Holdt viscosity versus time is shown in FIG. 2.

PREPARATION OF PAINTS

Various resinous binders of Examples I through XI described above were formulated into paint compositions for cationic electrodeposition. In making the paint compositions, the following pigment grinding vehicle, pigment pastes and catalyst paste were used:

QUATERNIZING AGENT

A quaternizing agent was prepared from the following charge:

| Ingredients | Parts by Weight | Solids |
|---|---|---|
| 2-ethylhexyl half-capped 2,4-toluene diisocyanate in methyl isobutyl ketone | 320.0 | 304 |
| dimethylethanolamine | 87.2 | 87.2 |
| aqueous lactic acid solution | 117.6 | 88.2 |
| 2-butoxyethanol | 39.2 | — |

The 2-ethylhexyl half-capped toluene diisocyanate was added to the dimethylethanolamine in a reaction vessel at room temperature. The mixture exothermed and was stirred for one hour at 80° C. Lactic acid was then added, followed by the addition of 2-butoxyethanol. The reaction mixture was stirred for about one hour at 65° C. to form the desired quaternizing agent.

PIGMENT GRINDING VEHICLE

A pigment grinding vehicle using the quaternizing agent described above was prepared from the following charge:

| Ingredients | Parts by Weight | Solids |
|---|---|---|
| EPON 829 | 710.0 | 682 |
| Bisphenol A | 289.6 | 289.6 |
| 2-ethylhexyl monourethane of 2,4-toluene diisocyanate in methyl isobutyl ketone | 406.4 | 386.1 |
| quaternizing agent | 496.3 | 421.9 |
| deionized water | 71.2 | — |
| 2-butoxyethanol | 1490 | — |

The EPON 829 and Bisphenol A were charged to a reaction vessel and heated under a nitrogen atmosphere to 150°-160° C. to initiate an exotherm. The reaction mixture was held at reflux for one hour, cooled to 120° C. and the 2-ethylhexyl half-capped toluene diisocyanate added. The temperature of the reaction mixture was held at 110°-120° C. for one hour followed by the addition of the 2-butoxyethanol. The reaction mixture was then cooled to 85°-90° C., homogenized, followed by the addition of the deionized water and quaternizing agent. The reaction mixture was held at 80°-85° C. until an acid value of about one was obtained. The pigment grinding vehicle had a resin solids content of about 56 percent.

CATALYST PASTE I

A catalyst paste using the pigment grinding vehicle described immediately above was prepared from the following charge:

| Ingredients | Parts by Weight |
|---|---|
| pigment grinding vehicle | 145 |
| deionized water | 321.6 |
| dibutyltin oxide | 200 |

The above ingredients were ground in Zircoa media to a Hegman No. 7 grind.

PIGMENT PASTE A

A pigment paste using the pigment grinding vehicle and the catalyst paste described above was prepared from the following charge:

| Ingredients | Parts by Weight |
|---|---|
| pigment grinding vehicle | 21.14 |

| Ingredients | Parts by Weight |
| --- | --- |
| clay | 20.41 |
| basic lead silicate | 2.90 |
| carbon black | 6.15 |
| strontium chromate | 1.45 |
| deionized water | 43.28 |

The paste was ground in Zircoa media to a Hegman No. 7 grind and combined with 4.67 parts by weight of Catalyst Paste I.

PIGMENT PASTE B

A pigment paste using the pigment grinding vehicle described above was prepared from the following charge:

| Ingredients | Parts by Weight |
| --- | --- |
| pigment grinding vehicle | 15.93 |
| clay | 14.76 |
| basic lead silicate | 2.10 |
| carbon black | 4.44 |
| strontium chromate | 1.05 |
| deionized water | 31.72 |

The paste was ground in Zircoa media to a Hegman No. 7¼ grind.

PIGMENT PASTE C

A pigment paste similar to Pigment Paste B was prepared from the following charge:

| Ingredients | Parts by Weight |
| --- | --- |
| pigment grinding vehicle | 139.6 |
| deionized water | 313.1 |
| clay | 148.9 |
| basic lead silicate | 13.78 |
| carbon black | 3.19 |
| strontium chromate | 12.14 |
| deionized water | 43.68 |

The paste was ground in Zircoa media to a Hegman No. 7 grind.

PIGMENT PASTE D

A pigment paste similar to Pigment Paste B was prepared from the following charge:

| Ingredients | Parts by Weight |
| --- | --- |
| pigment grinding vehicle | 24.46 |
| clay | 24.44 |
| basic lead silicate | 2.27 |
| carbon black | 5.70 |
| strontium chromate | 2.00 |
| deionized water | 41.13 |

The paste was ground in Zircoa media to a Hegman No. 7 grind.

PIGMENT PASTE E

A pigment paste similar to Pigment Paste A was prepared from the following charge:

| Ingredients | Parts by Weight |
| --- | --- |
| pigment grinding vehicle | 20.75 |
| clay | 23.30 |
| carbon black | 3.27 |
| basic lead silicate | 4.09 |
| strontium chromate | 2.04 |
| deionized water | 42.55 |

The paste was ground in Zircoa media to a Hegman No. 7 grind and combined with 4.00 parts by weight of Catalyst Paste I.

PIGMENT PASTE F

A pigment paste similar to Pigment Paste A was prepared from the following charge:

| Ingredients | Parts by Weight |
| --- | --- |
| pigment grinding vehicle | 23.57 |
| clay | 21.67 |
| basic lead silicate | 3.08 |
| carbon black | 6.52 |
| strontium chromate | 1.54 |
| deionized water | 39.62 |

The paste was ground to a Hegman No. 7 grind and combined with 4.00 parts by weight of Catalyst Paste I.

PAINT 1

A paint was prepared from the following mixture of ingredients:

| Ingredients | Parts by Weight |
| --- | --- |
| deionized water | 1790.6 |
| lead acetate | 12.48 |
| resinous vehicle of Example I | 1743.8 |
| Pigment Paste A | 330.0 |
| Pigment Paste B | 94.9 |

The resultant paint had a solids content of 20 percent, a pH of 6.25 and pigment-to-vehicle ratio of 0.2/1.0.

Zinc phosphate pretreated steel panels (BONDERITE 40) were electrodeposited in this paint at 280 volts for 2 minutes at a bath temperature of 78° F. (26° C.). The wet films were baked at 320° F. (160° C.) for 30 minutes to produce dry films having a thickness of about 0.44 mil. The films were cured, being able to withstand 100 acetone double rubs and had a Gardner reverse impact resistance of 160 inch-pounds.

Untreated steel panels (R-412Q) were electrodeposited at 280 volts for 2 minutes (bath temperature 26° C.) and baked at 320° F. (160° C.) for 30 minutes to produce cured films having a thickness of 0.54 mil. The coated panels were scribed with an "X" and exposed to a salt spray fog as described in ASTM D-117. After 14 days, the panels were removed from the chamber, dried, the scribe mark taped with masking tape, the tape pulled off at a 45° angle and the creepage from the scribe line was about ⅛ to 3/16 of an inch. Creepage is the area of the panel where the coating has lifted from the panel surface. When zinc phosphate pretreated steel panels were electrodeposited at 280 volts for 3 minutes, and the coatings baked at 320° F. (160° C.) for 30 minutes, cured coatings having a thickness of about 0.48 to 0.52 mil were obtained. Upon exposure to the salt spray fog for 14 days, the creepage from the scribe line was 1/64 of an inch.

PAINT 2

The resinous coating vehicle of Example I (without the blocked isocyanate crosslinker) was combined with 30 percent by weight of an aminoplast resin (melamine-formaldehyde condensate etherified with methanol, commercially available from American Cyanamid Company as CYMEL 303) and dispersed as described in Example I to form a 20 percent resin solids dispersion. When zinc phosphate pretreated steel panels were electrodeposited in this aqueous dispersion at 80 volts for 2 minutes (bath temperature 21° C.) and the coating baked for 30 minutes at 430° F. (221° C.), a cured coating having a thickness of 0.60 mil was obtained. The coating withstood 50 acetone double rubs before being removed and had a Gardner reverse impact resistance of 160 inch-pounds.

PAINT 3

The resinous coating vehicle of Example I (without the blocked isocyanate crosslinker) was combined with 30 percent by weight of a benzoguanamine resin (benzoguanamine-formaldehyde condensate etherified with methanol and ethanol, commercially available from American Cyanamid Company as XM 1123) and dispersed as described in Example I to form a 20 percent resin solids dispersion. When zinc phosphate pretreated steel panels were electrodeposited in this aqueous dispersion at 80 volts for 2 minutes (bath temperature 22° C.), the film cured at 430° F. (221° C.) for 30 minutes, a cured coating having a thickness of 0.7 mil was obtained. The coating withstood 40 acetone double rubs before being removed from the substrate and had a Gardner reverse impact resistance of 160 inch-pounds.

PAINT 4

A paint employing the resinous vehicle of Example II was prepared from the following charge:

| Ingredients | Parts by Weight |
| --- | --- |
| deionized water | 1760.3 |
| lead acetate | 12.48 |
| resinous vehicle of Example II | 1774.1 |
| Pigment Paste A | 330.0 |
| Pigment Paste B | 94.9 |

The paint contained 20 percent total solids, had a pH of 6.35 and a pigment-to-binder ratio of 0.2/1.0. Zinc phosphate pretreated steel panels were electrodeposited in this paint at 280 volts for 2 minutes (bath temperature 24° C.) and the wet films cured at 320° F. (160° C.) for 30 minutes to produce cured coatings having a thickness of 0.64 mil. The coatings withstood 100 acetone double rubs and had a Gardner reverse impact resistance of 160 inch-pounds. When exposed to a salt spray fog, the creepage from the scribe line was 1/64 of an inch after 14 days.

When untreated steel panels were electrodeposited at 280 volts for 2 minutes (bath temperature 24° C.) and the film cured at 320° F. (160° C.) for 30 minutes, a cured coating having a thickness of 0.74 mil was obtained. The scribe creepage after 14 days exposure to the salt spray fog was ⅛ of an inch.

PAINT 5

A paint was prepared from the resinous vehicle of Example III in the following charge:

| Ingredients | Parts by Weight |
| --- | --- |
| deionized water | 1588.4 |
| lead acetate | 13.9 |
| resinous vehicle of Example III | 1660.4 |
| Pigment Paste C | 462.4 |
| Catalyst Paste I | 14.8 |
| deionized water | 100.0 |

The paint had a total solids content of 20 percent, a pH of 6.15, a pigment-to-binder ratio of 0.2/1.0.

Zinc phosphate pretreated steel panels were electrodeposited in this paint at 250 volts for 2 minutes (bath temperature 25° C.) and the films baked at 320° F. (160° C.) for 30 minutes to produce films having a thickness of 0.7 mil. The coatings withstood 100 acetone double rubs and had 160 inch-pounds of Gardner reverse impact. After 14 days exposure to the salt spray fog, the coated panels had 1/64 inch creepage from the scribe line.

Untreated steel panels were electrodeposited at 220 volts for 2 minutes (bath temperature 25° C.) and the films baked at 320° F. (160° C.) for 30 minutes to yield films having a thickness of 0.62 mil. After being exposed to the salt spray fog for 14 days, the coated panels had ¼ of an inch creepage from the scribe line.

PAINT 6

A paint employing the resinous vehicle of Example V was prepared from the following charge:

| Ingredients | Parts by Weight |
| --- | --- |
| deionized water | 1528.0 |
| lead acetate | 7.44 |
| resinous vehicle of Example V | 1338.6 |
| Pigment Paste B | 332.1 |
| Catalyst Paste I | 12.1 |

The paint had a total solids content of 20 percent, a pH of 6.25 and a pigment-to-binder ratio of 0.2/1.0. Zinc phosphate pretreated steel panels were electrodeposited in this paint at 270 volts for 2 minutes (bath temperature 26° C.) and the films baked at 320° F. (160° C.) for 30 minutes to produce cured coatings having a thickness of 0.62 mil. The coatings withstood 100 acetone double rubs and had a Gardner impact resistance of 160 inch-pounds. When exposed to a salt spray fog for 14 days, the coated panels had 1/64 inch creepage from the scribe mark.

Untreated steel panels were electrodeposited at 250 volts for 2 minutes (bath temperature 26° C.). When the films were baked at 320° F. (160° C.) for 30 minutes, films having a thickness of 0.6 mil were obtained. After exposure to the salt spray fog for 14 days, the coated panels had ¼ inch creepage from the scribe mark.

PAINT 7

A paint employing the resinous vehicle of Example VI was prepared from the following charge:

| Ingredients | Parts by Weight |
| --- | --- |
| deionized water | 1639.0 |
| lead acetate | 13.9 |
| resinous vehicle of Example VI | 1660.1 |
| Pigment Paste D | 396.5 |
| Catalyst Paste I | 14.8 |
| deionized water | 70 |

The paint had a total solids content of 20 percent, a pH of 6.1 and a pigment-to-binder ratio of 0.2/1.0. Zinc phosphate pretreated steel panels were electrodeposited in the paint at 220 volts for 2 minutes (bath temperature 27° C.) and the coated panels baked at 320° F. (160° C.) for 30 minutes. The cured coatings had a thickness of 0.62 mil and when exposed to a salt spray fog for 14 days, 1/64 inch creepage from the scribe line was evidenced.

Untreated steel panels were electrodeposited at 190 volts for 2 minutes (bath temperature 27° C.). When the films were baked at 320° F. (160° C.) for 30 minutes, films having a thickness of 0.9 mil were obtained. After being exposed to a salt spray fog for 14 days, ⅛ inch creepage from the scribe line was evidenced.

PAINT 8

A paint employing the resinous vehicle of Example VII was prepared from the following charge:

| Ingredients | Parts by Weight |
| --- | --- |
| deionized water | 1753.6 |
| resinous vehicle of Example VII | 1644.8 |
| Pigment Paste E | 385.6 |

The paint had a total solids content of 20 percent, a pH of 6.35 and a pigment-to-binder ratio of 0.2/1.0.

Zinc phosphate pretreated steel panels were electrodeposited in the paint at 280 volts for 2 minutes (bath temperature 70° F., 21° C.) and the coated panels baked at 350° F. (177° C.) for 30 minutes. The cured coatings had a thickness of about 0.6 mil. The films were cured, being able to withstand 100 acetone double rubs without the film being removed from the substrate and had a Gardner reverse impact resistance of 120 inch-pounds. When exposed to a salt spray fog, the creepage from the scribe line was 1/64 of an inch after 14 days.

When untreated steel panels were electrodeposited at 180 volts for 2 minutes (bath temperature 70° F., 21° C.) and the film cured at 350° F. (177° C.) for 30 minutes, cured coatings having a thickness of 0.84 mil were obtained. The scribe creepage after 14 days exposure to a salt spray fog was ⅛ of an inch.

PAINT 9

A paint employing the resinous vehicle of Example IX was prepared from the following charge:

| Ingredients | Parts by Weight |
| --- | --- |
| deionized water | 1806.5 |
| lead acetate | 12.48 |
| resinous vehicle of Example IX | 1728.9 |
| Pigment Paste A | 330.0 |
| Pigment Paste B | 94.9 |

The paint had a total solids content of 20 percent, a pH of 6.25, and a pigment-to-binder ratio of 0.2/1.0.

Zinc phosphate pretreated steel panels were electrodeposited in the paint at 80 volts for 2 minutes (bath temperature 80° F., 27° C.) and the coated panels baked at 350° F. (177° C.) for 30 minutes. The cured coatings had a thickness of 0.68 mil and withstood 100 acetone double rubs without the coating being removed from the substrate.

Untreated steel panels were electrodeposited at 50 volts for 2 minutes (bath temperature 80° F., 27° C.). When the films were baked at 350° F. (177° C.) for 30 minutes, films having a thickness of 1.8 mils were obtained.

PAINT 10

A paint employing the resinous vehicle of Example X was prepared from the following ingredients:

| Ingredients | Parts by Weight |
| --- | --- |
| deionized water | 1757.8 |
| resinous vehicle of Example X (35.3% resin solids) | 1649.8 |
| Pigment Paste F | 392.3 |

The paint had a total solids content of 20 percent and a pigment-to-binder ratio of 0.2/1. Zinc phosphate pretreated steel panels were electrodeposited in the paint at 250 volts for 2 minutes (bath temperature 78° F., 26° C.) and the coated panels baked at 325° F. (163° C.) for 30 minutes. The cured coatings had a thickness of 0.68 mil, had a good appearance with slight orange peel and withstood 100 acetone double rubs. The paint had General Motors throwpower (bath temperature 80° F., 27° C., 300 volts for 2 minutes) of 9 inches.

PAINT 11

A paint employing the resinous vehicle of Example XI was prepared from the following charge:

| Ingredients | Parts by Weight |
| --- | --- |
| deionized water | 1883.1 |
| resinous vehicle of Example XI (38.2% resin solids) | 1524.6 |
| Pigment Paste F | 392.3 |

The paint had a total solids content of 20 percent, a pH of 6.2 and a pigment-to-binder ratio of 0.2/1.

Zinc phosphate pretreated steel panels were electrodeposited in the paint at 250 volts for 2 minutes (bath temperature 80° F., 27° C.) and the coated panels baked at 325° F. (163° C.) for 30 minutes. The cured coatings had a thickness of 0.5 mil with very good appearance. The coated panels withstood 100 acetone double rubs and had a GM throwpower (80° F., 27° C., 300 volts for 2 minutes) of 12¾ inches.

We claim:

1. A resinous binder suitable for use in cationic electrodeposition comprising the reaction product of:
   (A) a polyepoxide having a 1,2-epoxy equivalency greater than one,
   (B) a polymercapto compound, and
   (C) an amine;

the equivalent ratio of mercapto groups in (B) to epoxide groups in (A) being less than one; said reaction product containing cationic groups which are derived from the organic amine.

2. The resinous product of claim 1 in which the polyepoxide is a polyglycidyl ether of a cyclic polyol.

3. The resinous product of claim 2 in which the cyclic polyol is a polyphenol.

4. The resinous product of claim 1 in which the polyepoxide has a molecular weight greater than 350.

5. The resinous product of claim 1 in which the polymercapto compound is a polymeric polymercapto compound.

6. The resinous product of claim 1 or 5 in which the polymercapto compound is a dimercapto compound.

7. The resinous product of claim 5 in which the polymeric polymercapto compound is the reaction product of a polymeric polyol with a mercaptocarboxylic acid.

8. The resinous product of claim 7 in which the polymeric polyol is selected from the class consisting of polyester diols and polyether diols.

9. The resinous product of claim 1 in which the polymeric polymercapto compound has a molecular weight of from 200 to 3000.

10. The resinous product of claim 1 in which the organic amine is a primary and/or secondary amine.

11. The resinous product of claim 1 in which a portion of the organic amine is a ketimine of a polyamine.

12. The resinous product of claim 1 in which the amine is a tertiary amine.

13. The resinous product of claim 1 in which the equivalent ratio of mercapto groups in (B) to polyepoxide groups in (A) is about 0.1 to about 0.8:1.

14. The resinous product of claim 1 in combination with a curing agent.

15. The resinous product of claim 14 in which the curing agent is a capped polyisocyanate.

* * * * *